United States Patent [19]

Sweet

[11] E Patent Number: Re. 33,215

[45] Reissued Date of Patent: May 15, 1990

[54] METHOD OF ASSEMBLING TEXTILES

[76] Inventor: Paula J. Sweet, 270 Lafayette Street, New York, N.Y. 10012

[21] Appl. No.: 212,325

[22] Filed: Jun. 27, 1988

Related U.S. Patent Documents

Reissue of:

[64] Patent No.: 4,665,851
Issued: May 19, 1987
Appl. No.: 911,725
Filed: Sep. 26, 1986

[51] Int. Cl.[5] ..... A41D 27/08; D05B 1/00

[52] U.S. Cl. ..... 2/243 R; 112/262.1; 112/409; 112/429

[58] Field of Search ..... 2/243 R, 244, 211, 74, 2/75, 73, 69, 90, 106, 115; 112/262.1, 265.1, 266.1, 405, 9, 409, 410, 417, 427–429

[56] References Cited

U.S. PATENT DOCUMENTS

| | | | |
|---|---|---|---|
| 174,637 | 3/1876 | Oakley | 112/409 |
| 336,149 | 2/1886 | Noyes | 112/409 X |
| 1,458,624 | 6/1923 | MacDaid, Jr. | 112/428 X |
| 1,750,844 | 3/1930 | Jopson | 112/409 X |
| 2,311,575 | 2/1943 | Robinson | 112/9 |
| 2,493,735 | 1/1950 | Alifano et al. | 164/17.5 |
| 2,675,074 | 4/1954 | Surber | 112/409 |
| 2,883,667 | 4/1959 | Kraus | 2/75 |
| 3,024,518 | 3/1962 | Newton | 28/72 |
| 3,060,446 | 10/1962 | Horne | 2/211 X |
| 3,423,761 | 1/1969 | Nickerson | 2/74 |
| 3,950,587 | 4/1976 | Colijn et al. | 428/234 |
| 4,067,278 | 1/1978 | Davis | 112/429 X |
| 4,341,829 | 7/1982 | Gold | 428/53 |

*Primary Examiner*—H. Hampton Hunter
*Attorney, Agent, or Firm*—Donald S. Dowden

[57] ABSTRACT

A composite fabric adapted to the manufacture of garments and the like is made by spreading a given length of decorative fabric in a given spreading direction to form a plurality of layers of spread decorative fabric each lying in horizontal plane, cutting the layers of decorative fabric in a plurality of vertical cutting planes each parallel to the spreading direction to form a plurality of narrow strips of spread fabric each having the same given length, and slitting opposite sides of each of the narrow strips of spread fabric in a plurality of slitting planes each normal to the spreading direction to form a plurality of center webs respectively extending the length of the strips and each bordered by a plurality of fringes, each of the fringes having a length less than one-half the width of the respective strips and extending in a direction parallel to the slitting planes. The strips are unlayered with the fringes formed thereon, and each of the unlayered strips is quilted to a base fabric. The base fabric with the strips quilted thereto is then washed, thereby causing the fringes to curl.

15 Claims, 3 Drawing Sheets

METHOD OF ASSEMBLING TEXTILES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the manufacture of composite fabrics and, in particular, to a novel and highly-effective method for the manufacture of a composite fabric comprising a base fabric to which decorative strips of fringed fabric are applied.

2. Description of the Prior Art

Applicant's prior design U.S. Pat. No. Des. 257,696 discloses a jacket the outside of which is formed of cloth strips that provide a distinctive appearance. Other garments made of a composite fabric comprising a base fabric to which decorative strips of fringed fabric are applied are known.

While such garments are attractive, prior methods of manufacturing them are expensive, which limits the ability of consumers to purchase and enjoy them. In particular, a manufacturing method wherein hundreds of cloth strips are individually applied to a base fabric of a garment is prohibitively expensive.

The broad idea of a textile strip which is notched or cut from opposite sides to form a fringe or the like is shown in Oakley U.S. Pat. No. 174,637 and Noyes U.S. Pat. No. 336,149.

The Oakley patent discloses a ribbon that is plaited and stitched. Two or more such ribbons may be attached one above the other or back to back.

The Noyes patent discloses a ruching for decorating, composed of sections connected end to end to form a strip of indefinite length, each section being composed of a number of superposed sheets of tissue paper cut partly across from one or both edges into narrow filaments that form fringes and are connected and held in place by the uncut portions of the paper. The filaments are opened out and caused to project in all directions, so as to cover the uncut portion of the paper and give the ruching a fluffy appearance.

A Surber U.S. Pat. No. 2,675,074 discloses a sewing machine attachment having a pair of cutting blades that form slits in a strip of material drawn through the machine.

A Gold U.S. Pat. No. 4,341,829 discloses a nonwoven backing material to which selvage bands each comprising a woven portion and a fringed portion are adhered by a needle. The fringed portion comprises the weft threads of the original woven fabric from which the selvage has been removed.

None of these patents discloses an efficient and inexpensive method of manufacturing a composite fabric comprising a base fabric to which decorative strips of fringed fabric are applied.

OBJECTS AND SUMMARY OF THE INVENTION

An object of the invention is to remedy the problems of the prior art noted above and in particular to provide an efficient and inexpensive method of manufacturing a composite fabric comprising a base fabric to which decorative strips of fringed fabric are applied.

In accordance with one aspect of the present invention, there is provided a method of making a composite fabric adapted to the manufacture of garments and the like, the method comprising the steps of spreading a given length of decorative fabric in a given spreading direction to form a plurality of layers of spread decorative fabric each lying in a horizontal plane; cutting the layers of decorative fabric in a plurality of vertical cutting planes each parallel to the spreading direction to form a plurality of narrow strips of spread fabric each having the same given length; slitting opposite sides of each of the narrow strips of spread fabric in a plurality of slitting planes each normal to the spreading direction to form a plurality of center webs respectively extending the length of the strips and each bordered by a plurality of fringes, each of the fringes having a length less than one-half the width of the respective strips and extending in a direction parallel to the slitting planes; unlayering each of the strips with the fringes formed thereon; quilting each of the unlayered strips to a base fabric; and washing the base fabric with the strips quilted thereto, thereby causing the fringes to curl.

BRIEF DESCRIPTION OF THE DRAWING

A better understanding of the objects, features and advantages of the invention can be gained from the following detailed description of a preferred embodiment thereof, in conjunction with the appended figures of the drawing, wherein a given reference character always refers to the same element or part and wherein.

DESCRIPTION OF THE PREFERRED EMBODIMENTS

Figure 1:
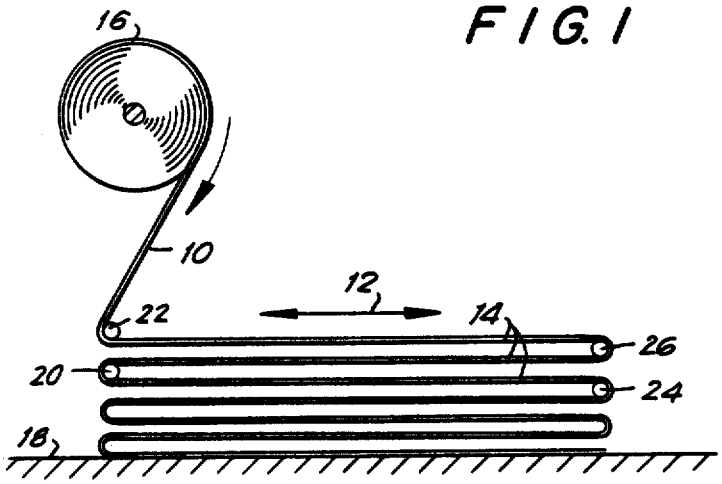
FIG. 1 is diagrammatic view in elevation showing the spreading of a given length of decorative fabric in a given spreading direction to form a plurality of layers of spread decorative fabric each lying in a horizontal plane.

FIG. 1 illustrates the spreading of a given length of decorative fabric 10 back and forth in a given spreading direction 12 to form a plurality of layers 14 of spread decorative fabric each lying in a horizontal plane. To effect the spreading, a roll 16 of fabric, typically about 150 yards in length and a bit more than a yarn wide, is positioned above a spreading table 18. Spreading is accomplished by passing the roll 16 of fabric 10 back and forth over the spreading table 18, a layer 14 of fabric being laid down with each pass as shown in FIG. 1. A couple of rods 20, 22 and 24, 26 at each end of the pass hold the fabric 10 at each fold. The lower rod 20 or 24 at each end of the pass is withdrawn lengthwise and used as the upper rod (above the rod 22 or 26) as the layering progresses. Spreading per se is known.

After many layers 14 have been put down, the layered fabric is slit with a vertical knife 28 (FIG. 2) to form narrow strips 32, 34, 36, etc. While still layered, the strips are fringed with a vertical knife (FIG. 3), which may be the same knife 28 or a different knife, to form narrow strips 38, 40 first on one side and then on the other side of the narrow strips.

In accordance with invention, the step of spreading comprises forming at least a hundred layers 14 of the decorative fabric 10 and preferably substantially three hundred layers.

Figure 2:
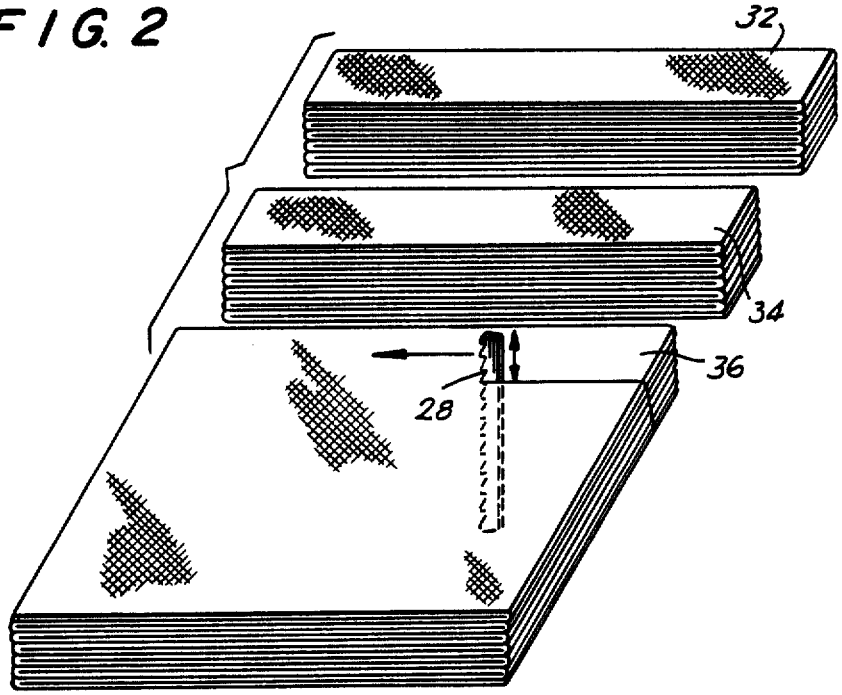
FIG. 2 is a perspective view illustrating the cutting of the layers of decorative fabric in a plurality of vertical cutting planes each parallel to the spreading direction to form a plurality of narrow strips of spread fabric each having the same given length.
Figure 3:
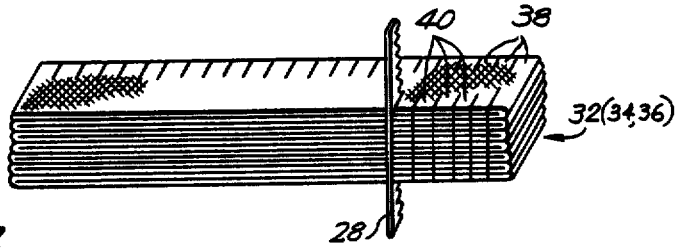
FIG. 3 is a perspective view showing the slitting of opposite sides of a representative one of the narrow strips of spread fabric in a plurality of slitting planes each normal to the spreading direction to form a plurality of center webs respectively extending the length of the strips and each bordered by a plurality of fringes, each of the fringes having a length less than one-half the width of the respective strips and extending in a direction parallel to the slitting plane.

The vertical cutting planes formed by the knife 28 in FIG. 2 are preferably uniformly spaced, and the slitting planes formed by the knife 28 in FIG. 3 are also preferably uniformly spaced.

The slitting of opposite sides of each of the narrow strips 32, 34, 36, etc., of spread fabric in a plurality of slitting planes defined by the knife 28 in FIG. 3, each slitting plane being normal to the spreading direction 12, forms a plurality of center webs 42 respectively extending the length of the strips 32, 34, 36, respectively, and bordered by the fringes 38, 40. Each of the fringes 38, 40 has a length less than one-half the width of the strips 32, 34, 36, etc., and the major dimension of each of the fringes 38, 40 extends in a direction parallel to the slitting planes defined by the knife 28.

Figure 4:
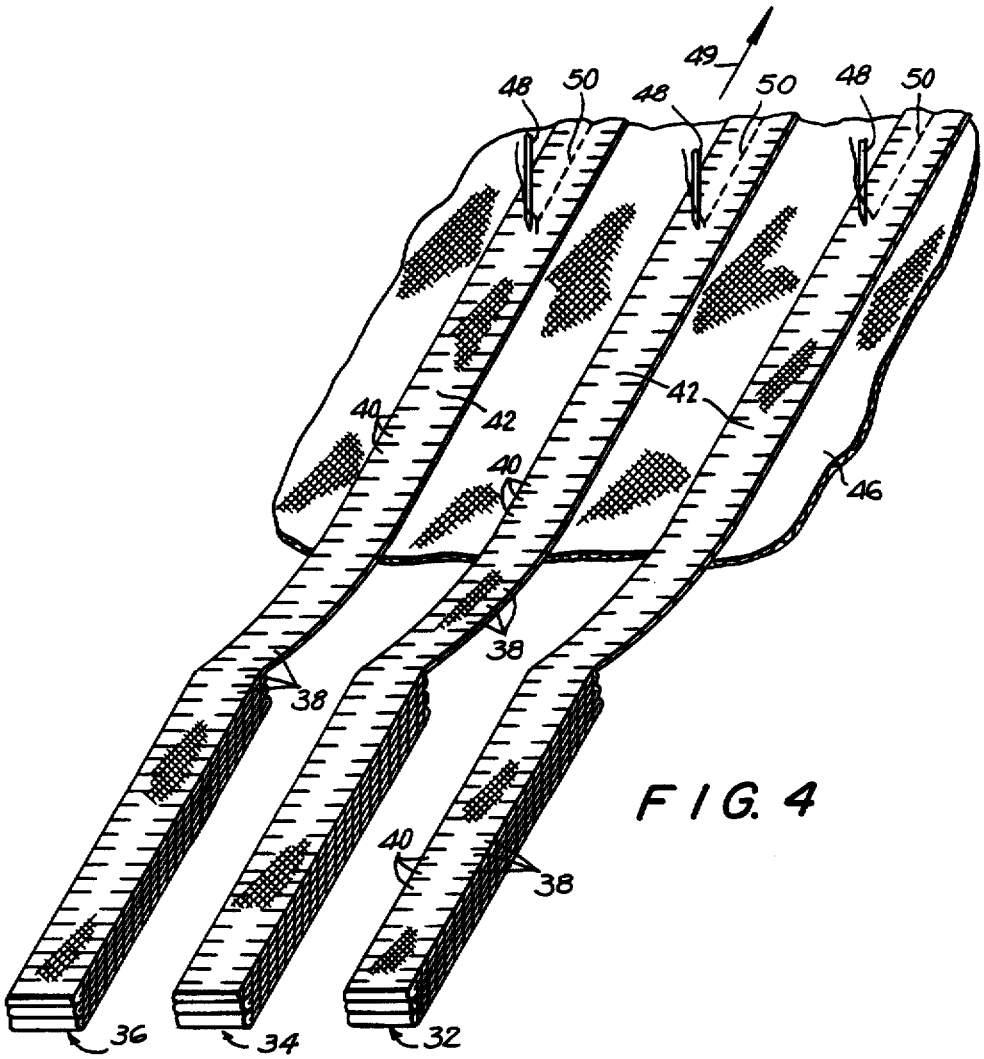
FIG. 4 illustrates the unlayering of the strips with the fringes formed thereon and the quilting of the unlayered strips to a base fabric.

The strips 32, 34, 36, etc., are unlayered, preferably simultaneously as shown in FIG. 4, with the fringes 38, 40 formed thereon. The unlayered strips are quilted, preferably simultaneously, to a base fabric 46 by needles 48 as the strips and base fabric advance in the direction indicated by an arrow 49. The needles 48 are in a quilting machine that is known per se. Alternatively, the strips may be stitched individually to the base fabric 46 by a single-needle sewing machine or by hand. The quilting preferably employs a railroad stitch, which is a straight-line stitch, and the stitch is preferably applied to the several center webs 42. The strips are preferably uniformly spaced on the base fabric 46 during the quilting step illustrated in FIG. 4.

Figure 5:
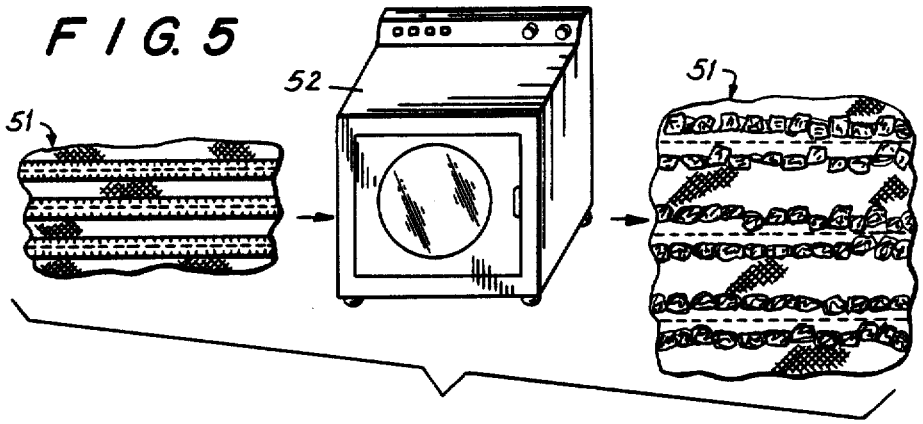
FIG. 5 is a diagrammatic view (in three parts respectively drawn to different scales) illustrating the washing of the base fabric with the strips quilted thereto, thereby causing the fringes to curl.

The base fabric 46 and the strips 32, 34, 36 attached thereto by stitching 50 form a composite fabric 51 shown in FIG. 5. The composite fabric 50 is washed as in a washing machine 52, thereby causing the fringes to curl, as illustrated in FIG. 5.

Figure 6:
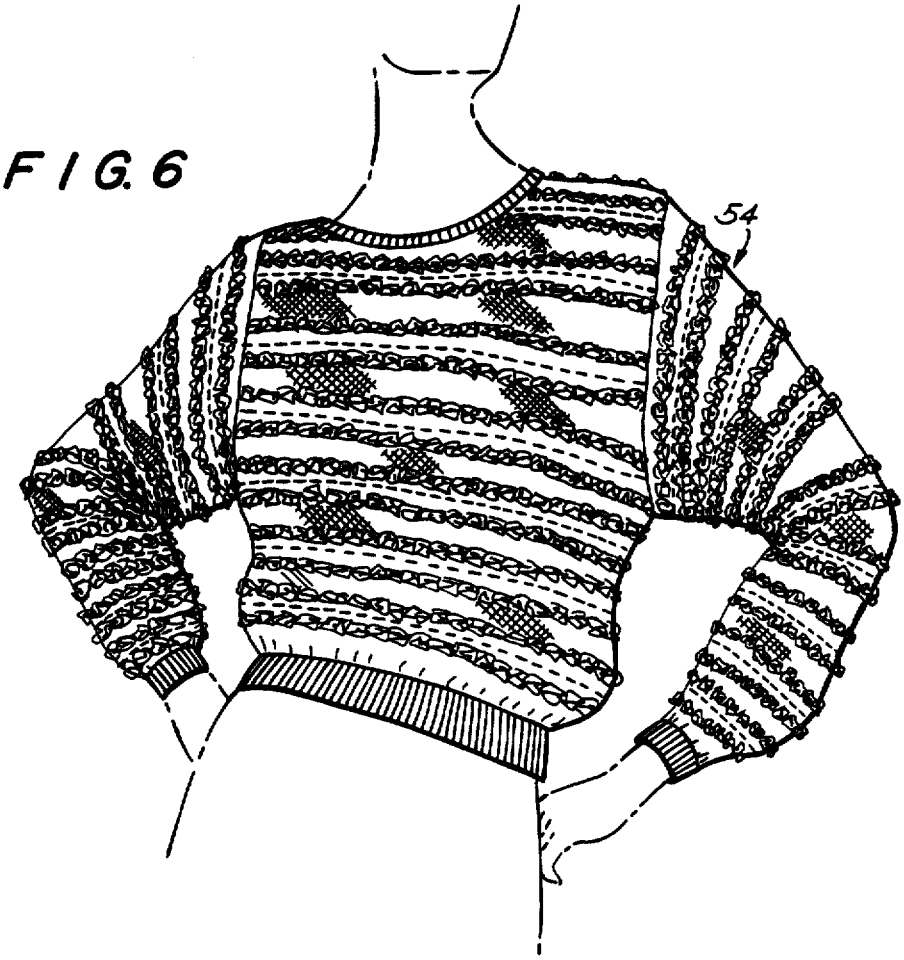
FIG. 6 is a perspective view illustrating a garment made of the washed composite fabric illustrated in FIG. 5.

The washing step of FIG. 5 is the final step of the method as broadly conceived. The composite fabric 50 after being washed can be sold as is or made into a garment 54, as illustrated in FIG. 6.

Thus there is provided in accordance with the invention a novel and highly-effective method for the manufacture of a composite fabric comprising a base fabric to which decorative strips of fringed fabric are applied. The invention provides an efficient and inexpensive method of manufacturing the composite fabric and makes it possible to supply the fabric or garments made from the fabric to a large base of consumers.

Many modifications of the preferred embodiment of the invention disclosed herein will readily occur to those skilled in the art. For example, while the strips 32, 34, 36 are described as "decorative", this term is not intended to limit the strips 32, 34, 36 to any particular color, print or fabric. The strips may, for example, be muslin in a solid color or multicolored or may be undyed. While the cutting planes are preferably uniformly spaced and the slitting planes are also preferably uniformly spaced, the spacings may be varied for effect. While the unlayering and quilting is preferably performed with respect to all of the strips simultaneously, they may be performed sequentially instead. While a railroad stitch is preferred, a stitch describing a curve may also be employed in accordance with the invention. While the strips are preferably uniformly spaced on the base fabric, the spacing may be varied for effect. While the garment made from the composite fabric 50 is illustrated as a pullover (made of cotton, for example), other garments such as jackets, dresses, blouses, etc., can be made from the composite fabric in accordance with the invention.

Accordingly, the invention is not limited except by the appended claims.

I claim:

1. A method of making a composite fabric adapted to the manufacture of garments and the like, said method comprising the steps of:

spreading a given length of decorative fabric in a given spreading direction to form a plurality of layers of spread decorative fabric each lying in a horizontal plane;

cutting said layers of decorative fabric in a plurality of vertical cutting planes each parallel to said spreading direction to form a plurality of narrow strips of spread fabric each having said given length;

slitting opposite sides of each of said narrow strips of spread fabric in a plurality of slitting planes each normal to said spreading direction to form a plurality of center webs respectively extending the length of said strips and each bordered by a plurality of fringes, each of said fringes having a length less than one-half the width of said respective strips and extending in a direction parallel to said slitting planes;

unlayering each of said strips with said fringes formed thereon;

quilting each of said unlayered strips to a base fabric; and washing said base fabric with said strips quilted thereto, thereby causing said fringes to curl.

2. A method according to claim 1 wherein said step of spreading comprises forming at least 100 layers of said decorative fabric.

3. A method according to claim 1 wherein said step of spreading comprises forming substantially 300 layers of said decorative fabric.

4. A method according to claim 1 wherein said step of cutting comprises uniformly spacing said cutting planes.

5. A method according to claim 1 wherein said step of slitting comprises uniformly spacing said slitting planes.

6. A method according to claim 1 wherein said step of unlayering is performed with respect to all of said strips simultaneously.

7. A method according to claim 1 wherein said step of quilting is performed with respect to all of said strips simultaneously.

8. A method according to claim 1 wherein said step of quilting employs a railroad stitch.

9. A method according to claim 1 wherein said step of quilting comprises stitching said webs.

10. A method according to claim 1 wherein said step of quilting comprises uniformly spacing said strips on said base fabric.

11. A method according to claim 1 wherein said step of washing is the final step of said method.

12. A method according to claim 1 further comprising the step of employing said composite fabric to make a garment.

*13. A clothing manufacturing method comprising the steps of:*

*providing a plurality of narrow strips of fabric;*

*slitting at least one edge of each of said strips to form a plurality of fringes along at least one edge of each of said strips;*

*attaching each of said strips to a base fabric to form a composite fabric;*

*curling said fringes; and*

*employing said composite fabric to make a garment.*

*14. A clothing manufacturing method according to claim 13, wherein said slitting comprises the step of slitting each edge of each of said strips to form a plurality of fringes along each edge of each of said strips.*

*15. A clothing manufacturing method according to claim 13, wherein said curling comprises the step of washing said composite fabric.*

* * * * *